(12) United States Patent
Krenkel et al.

(10) Patent No.: US 6,308,808 B1
(45) Date of Patent: Oct. 30, 2001

(54) BRAKE DISK FOR DISK BRAKES

(75) Inventors: Walter Krenkel, Renningen; Richard Kochendörfer, Stuttgart, both of (DE)

(73) Assignee: Deutsches Zentrum Für Luft-und Raumfahrt e.V., Bonn (DE)

( * ) Notice: Subject to any disclaimer, the term of this patent is extended or adjusted under 35 U.S.C. 154(b) by 721 days.

(21) Appl. No.: 08/848,719

(22) Filed: May 19, 1997

Related U.S. Application Data

(63) Continuation of application No. 08/565,822, filed on Dec. 1, 1995, now abandoned.

(30) Foreign Application Priority Data

Dec. 17, 1994 (DE) .................................................. 44 45 226

(51) Int. Cl.[7] .................................................. F16P 65/12
(52) U.S. Cl. .................................................. 188/218 XL
(58) Field of Search .................. 188/264 AP, 251 A, 188/251 M, 218 XL, 18

(56) References Cited

U.S. PATENT DOCUMENTS

| 3,486,218 | * | 12/1969 | Buyze | 188/218 XL |
|---|---|---|---|---|
| 3,559,775 | * | 2/1971 | Miller | 188/218 XL |
| 3,809,192 | * | 5/1974 | Stehle | 188/218 XL |
| 4,049,085 | * | 9/1977 | Blunier | 188/218 XL |
| 4,263,992 | * | 4/1981 | Moore et al. | 188/218 XL |
| 4,742,948 | | 5/1988 | Fisher et al. | 188/251 M |
| 4,926,977 | * | 5/1990 | Gassiat | 188/264 AA |
| 6,042,935 | | 3/2000 | Krenkel et al. | . |
| 6,086,814 | | 7/2000 | Krenkel et al. | . |

FOREIGN PATENT DOCUMENTS

| 32 24 192 C2 | 2/1983 | (DE) . |
|---|---|---|
| 44 45 226 A1 | 6/1996 | (DE) . |
| 0 318 687 A2 | 6/1989 | (EP) . |
| 0 374 158 B1 | 9/1992 | (EP) . |
| 0 717 214 B1 | 12/1999 | (EP) . |
| 2225654 | 11/1974 | (FR) . |
| 2 228 053 | 8/1990 | (GB) . |
| 4-249627 | 9/1992 | (JP) . |

* cited by examiner

*Primary Examiner*—Matthew C. Graham
(74) *Attorney, Agent, or Firm*—Crowell & Moring, LLP

(57) ABSTRACT

In a brake disk for a vehicle disk brake, a material from the carbon group is used for an internally ventilated disk brake. The individual components, such as the friction rings and the ribs, are manufactured individually or partially together and can be fastened to one another by way of an unreleasable connection, such a high-temperature welding or gluing.

13 Claims, 4 Drawing Sheets

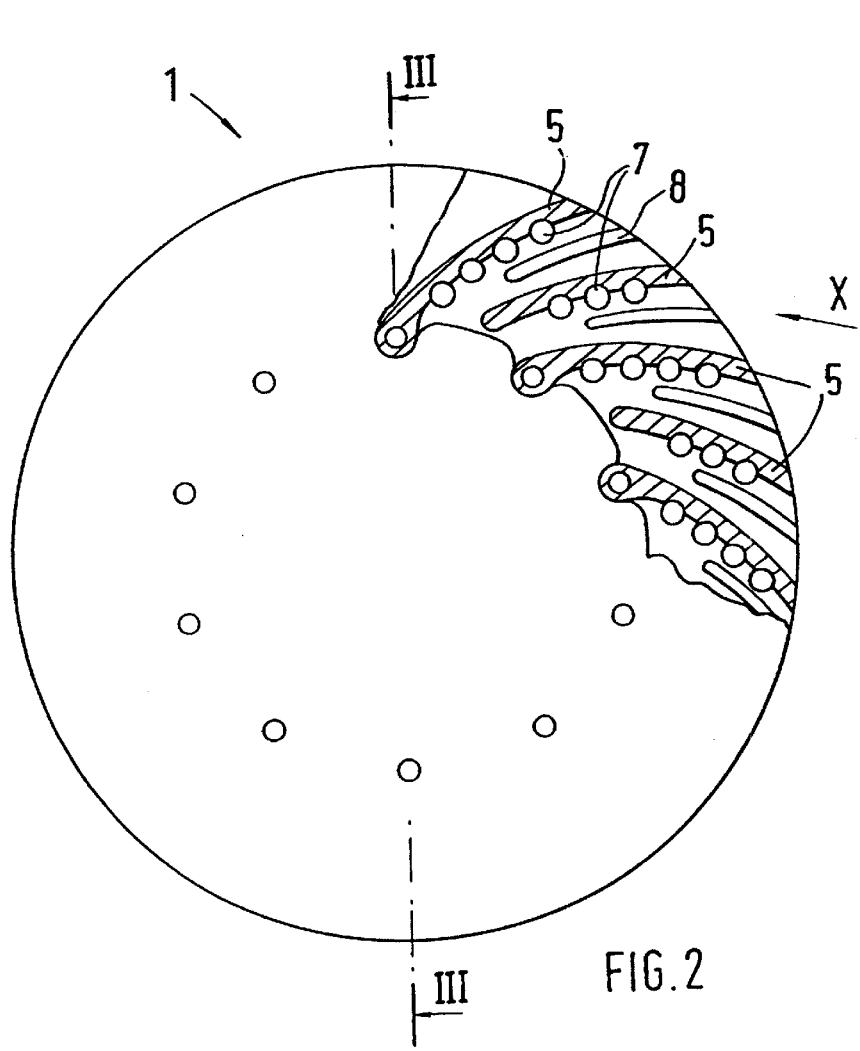
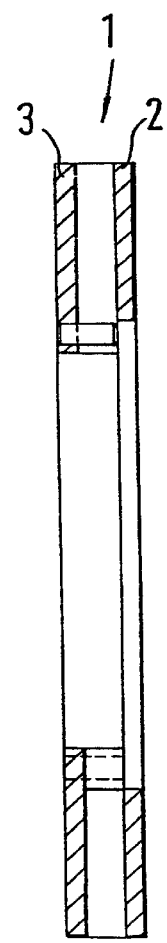
FIG. 2
FIG. 3
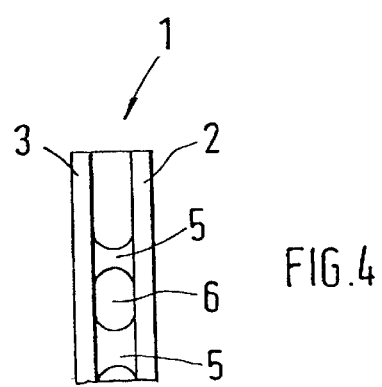
FIG. 4

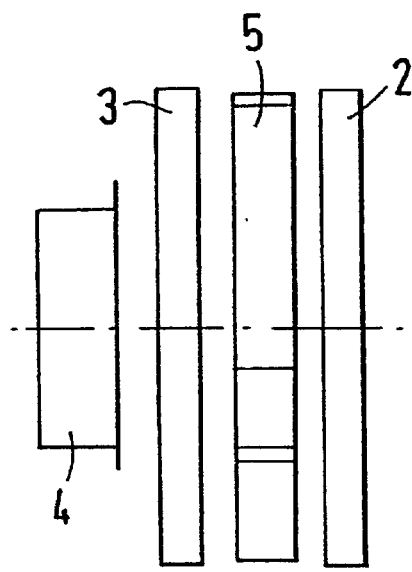
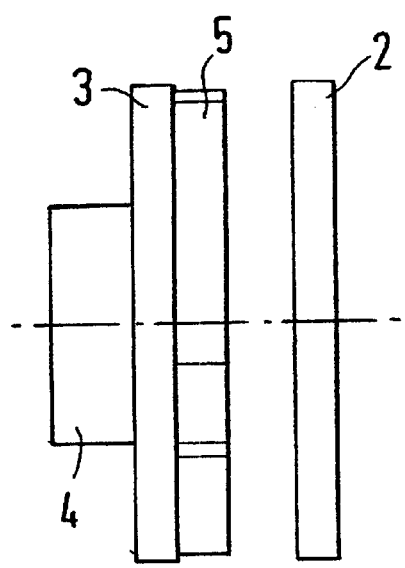
FIG.5  FIG.6
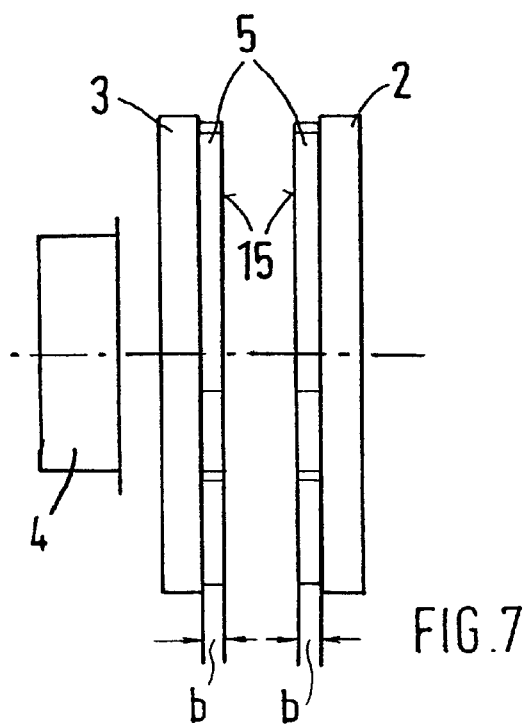
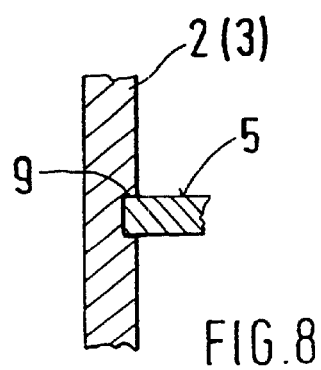
FIG.7  FIG.8

BRAKE DISK FOR DISK BRAKES

This is a continuation of U.S. application Ser. No. 08/565,822, filed Dec. 1, 1995, now abandoned.

BACKGROUND AND SUMMARY OF THE INVENTION

The present invention relates to a brake disk for disk brakes, and more particularly, to a vehicle disc brake having a brake disk selected from a carbon group material.

DE 32 24 192 A1 describes a brake disk made of a carbon material having no internal ventilation. Furthermore, EP 0 374 158 B1 describes a process for manufacturing an object, such as a brake disk made of a carbon material. This known brake disk, which is not internally ventilated, has through-openings in the disk which, in the case of the substrate, are created during the weaving.

It is an object of the invention to produce, from a carbon or a carbon-fiber-reinforced material, a brake disk which is easy to manufacture and ensures a free technical design, particularly with respect to the ducts and the construction of the friction disks.

According to the invention, this object has been achieved by configuring the brake disk, as an internally ventilated disk, consisting of two friction rings which can be produced individually and are unreleasably connected with each other.

Among the principal advantages achieved by way of the present invention are that an internally-ventilated disk brake with radial air ducts can be produced in several parts from a carbon or a carbon-fiber-reinforced material and the individual components of the brake disk can be connected with one another by way of a suitable-connecting method, as, for example, a high-temperature soldering or a gluing process.

A separate manufacturing is therefore possible of the two friction rings, of the pot and of the ribs whose configuration is therefore freely selectable.

The pot may also be pressed into a mold together with a friction ring as a one-part component. The pot may also be connected with the friction ring by screws and connection elements. Together with a friction ring, the radial ribs for forming air ducts may also be produced as a one-part component.

Furthermore, the construction according to the present invention has the advantage that, because of the open manufacturing method, the radial ducts have a radial shape and cross-section which, with a closed manufacturing process, for example, in a casting process, cannot easily be obtained. Thus, half-ribs may also be arranged between the radial ribs on each friction disk.

When the radial ribs are manufactured separately from the friction rings, these can be inserted in molded-in grooves in interior surfaces of the friction rings and can be undetachably fastened in the latter so that the two friction rings are connected with one another for forming the brake disk.

It is also possible to produce the brake disk in halves in such that the radial ribs are molded with half a wall width on one respective friction ring. A connection of the friction rings will then take place by way of the face of the ribs which may be constructed correspondingly for this purpose.

BRIEF DESCRIPTION OF THE DRAWINGS

These and other objects, features and advantages of the present invention will become more readily apparent from the following detailed description thereof when taken in conjunction with the accompanying drawings wherein:

FIG. 2 is a plan view of a friction ring of the brake disk with radial ribs and half ribs and bores also shown partially cut-away;

FIG. 3 is a sectional view of a brake disk along line III—III of FIG. 2;

FIG. 4 is a view into the air ducts in the direction of arrow X in FIG. 2;

FIG. 5 is a schematic view of the brake disk consisting of a separately produced pot, separately produced friction rings and separately produced radial ribs;

FIG. 6 is a schematic view of the brake disk consisting of a pot with the friction ring and the radial ribs produced in one piece;

FIG. 7 is a schematic view of the brake disk consisting of the individually produced pot and individually produced friction rings which each carry half a radial rib;

FIG. 8 is a cross-sectional view of an arrangement of a radial rib in a groove of the friction ring;

DETAILED DESCRIPTION OF THE DRAWINGS

Figure 1:
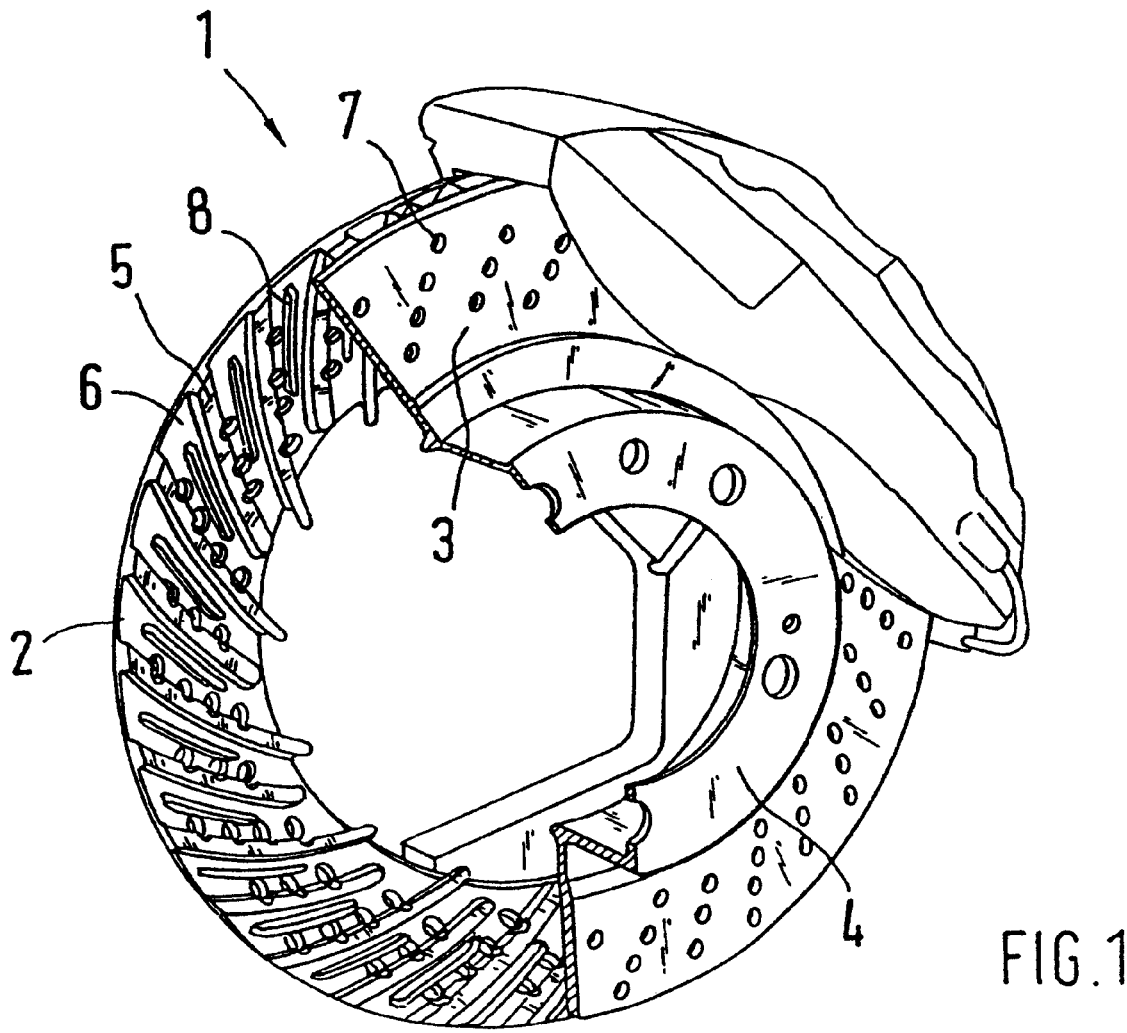
FIG. 1 is a perspective view of an internally ventilated brake disk made of a carbon material with a portion shown cut-away.

An internally ventilated brake disk 1 in the form of a carbon-fiber-reinforced material comprises essentially two friction rings 2, 3 and a pot 4. The friction rings 2, 3 are connected with one another by radial ribs 5 forming air ducts 6 for cooling the disk 1. Continuous bores 7 in different arrangements are provided in the friction rings 2, 3. Furthermore, half-ribs 8 may be arranged between the radial ribs 5 which are situated opposite one another in air ducts 6 by way of a clearance.

The brake disk 1 is essentially produced from two friction rings 2, 3 which are individually produced in molds and which are connected with one another by a suitable method, such as a high-temperature soldering or gluing. Because it is possible to produce the brake disk 1 in separate parts, manufacturing variations are permitted.

Thus, all parts of the brake disk 1 may be produced individually i.e., the pot 4, the two friction rings 2, 3 and the radial ribs 5, as illustrated in FIG. 5. If it seems expedient, one friction disk 3 may be formed integrally with the pot 4, as illustrated in FIG. 6. Furthermore, the ribs 5 may be produced together with either friction disk 2 or 3.

When the ribs 5 are produced individually, they may either be butt-jointed with the surfaces of the friction rings 2, 3. Alternatively, grooves 9 can be provided in one or both of the friction rings 2, 3 to extend corresponding to the radial ribs 5, as illustrated in FIG. 8.

According to another embodiment of the present invention, the radial ribs 5, as illustrated in detail in FIG. 7, in each case in halves with the friction disks 2, 3 in a mold. A connection of the friction disks 2, 3 will then take place by way of the faces 15 of the ribs which, for this purpose, can have a plane construction or a special configuration.

The half-ribs 8 provided between the radial ribs 5 can be produced in one manufacturing operation with the friction disks 2, 3.

After the completion of the brake disk 1, the throughbores 7 can be placed, as required. Because of the two-part or multi-part manufacturing method of the brake disk 1 made of a carbon-fiber-reinforced material, a duct shape of the air ducts can have a largely free configuration.

Figure 9:
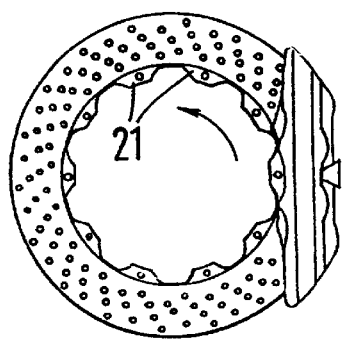
FIGS. 9 and 10 are front and side views, respectively, of the friction rings of the brake disk, at least one of the friction rings being connected with the pot by a screwed connection.
Figure 10:
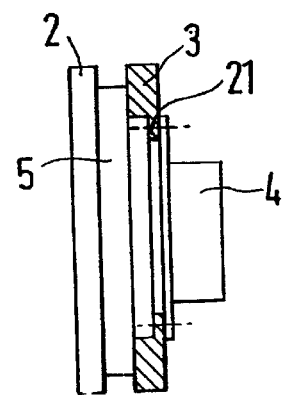
Figure 11:
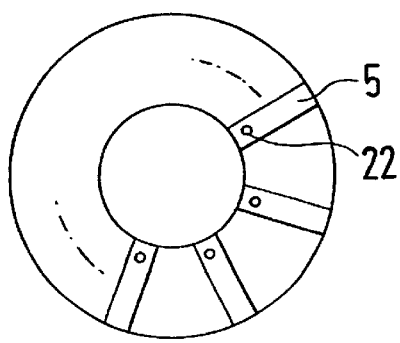
FIGS. 11 and 12 are front and side views, respectively, of the friction rings of the brake disk, in which at least one friction ring is fastened with the molded-on radial ribs by a screwed connection.
Figure 12:
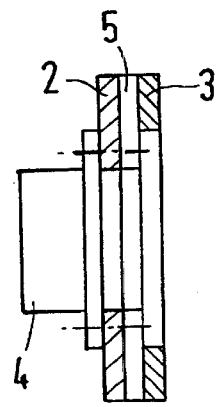

As illustrated in detail in FIGS. 9 and 10, one friction ring 2 or 3 may be connected with the pot 4 by conventional screws. The other friction ring 2 will then be constructed in one piece with the radial ribs 5 and may be connected with the friction ring 3 by soldering or gluing. For the fastening of the friction ring 3 to the pot 4, the friction ring 3 has projecting lugs 21. In FIGS. 11 and 12, the fastening of the pot 4 to the brake disk 1 takes place by screws which are arranged in bores 22 of the ribs 5 and of the one friction ring 2 or 3. A fastening may also take place by way of the two friction rings 2, 3 and the rib 5.

Figure 13:
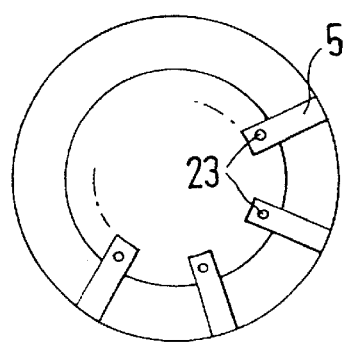
FIGS. 13 and 14 are front and side views, respectively, of the friction rings of the brake disk, in which the pot is connected with the brake disk only by the ribs.
Figure 14:
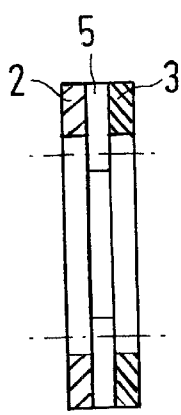

In FIGS. 13 and 14, the fastening of the pot 4 to the friction rings 2, 3 of the brake disk 1 takes place by the ribs 5 which, for this purpose, each have a bore 23 through which conventional screw bolts (not shown) are fitted.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A disk for a vehicle disk brake, comprising individual carbon friction rings and discrete and circumferentially spaced, generally radially extending ribs for connecting the rings with each other by way of high temperature soldering or gluing and configured to form air ducts for internal ventilation.

2. The brake disk according to claim 1, wherein one of the friction rings is configured to be formed, in a mold, together with a hub as a single component.

3. The brake disk according to claim 1, wherein individually producible components of the brake disk are arranged to be connected with one another by high-temperature soldering.

4. The brake disk according to claim 1, wherein the individually produced components are configured to be connected with one another by gluing.

5. The brake disk according to claim 1, wherein the friction rings include half-ribs on an inside portion thereof between the radial ribs.

6. The brake disk according to claim 1, wherein half-ribs are arranged opposite each other on each interior side of the friction rings to define a clearance therebetween.

7. The brake disk according to claim 1, wherein the radial ribs are held in corresponding grooves on at least one interior surface of the friction rings and are unreleasably fixed therein by a connection.

8. The brake disk according to claim 1, wherein the friction rings are configured by the radial ribs of half a wall width, and the friction rings are each unreleasably connected with one another by face-side surfaces of the radial ribs.

9. The brake disk according to claim 1, wherein throughbores are arranged in an area of the air ducts, after assembly of the brake disk.

10. The brake disk according to claim 1, wherein screws connect a hub with at least one of the friction rings and the friction rings are connected unreleasably with the radial ribs of associated air ducts.

11. The brake disk according to claim 1, wherein screws connect a hub with at least one of the friction ring and the radial ribs of air ducts, the screws being arranged in bores of the radial ribs and bores of the at least one of the friction rings, and the friction rings and the ribs are unreleasably connected with each other.

12. The brake disk according to claim 1, wherein the radial ribs connect a hub with the brake disk, and a releasable connection of at least one of the friction rings and the ribs with one another is provided.

13. A method of making a brake disk for a motor vehicle, comprising the steps of providing two individual friction rings from a material selected from the carbon group, providing internal air ducts between the friction rings in the form of discrete ribs unconnected with each other, and unreleasably connecting the friction rings with each other via the ribs by a high-temperature soldering or gluing process to form the brake disk with internal ventilation.

* * * * *